United States Patent
Romero

(10) Patent No.: US 11,210,883 B2
(45) Date of Patent: Dec. 28, 2021

(54) FACILITY ACCESS REGULATING SYSTEM AND METHOD

(71) Applicant: Overhead Door Corporation, Lewisville, TX (US)

(72) Inventor: Federico Romero, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 16/453,693

(22) Filed: Jun. 26, 2019

(65) Prior Publication Data

US 2020/0410792 A1 Dec. 31, 2020

(51) Int. Cl.
*G07C 9/30* (2020.01)
*G01S 13/88* (2006.01)

(52) U.S. Cl.
CPC ............. *G07C 9/30* (2020.01); *G01S 13/887* (2013.01)

(58) Field of Classification Search
CPC ................................. G07C 9/30; G10S 13/887
See application file for complete search history.

(56) References Cited

U.S. PATENT DOCUMENTS

| | | | | |
|---|---|---|---|---|
| 5,146,711 A | * | 9/1992 | Gallenschutz | E06B 11/08 49/46 |
| 8,905,218 B2 | * | 12/2014 | Talpe | G07C 9/10 194/205 |
| 9,051,748 B2 | * | 6/2015 | Slagel | E06B 11/08 |
| 10,229,328 B2 | | 3/2019 | Nikolova et al. | |
| 2003/0208966 A1 | * | 11/2003 | Puskaric | E05G 5/003 52/64 |
| 2008/0246619 A1 | * | 10/2008 | Colson | G01J 5/08 340/584 |
| 2013/0040405 A1 | * | 2/2013 | Segatori | G01N 33/54373 436/501 |
| 2013/0298466 A1 | * | 11/2013 | Osann, Jr. | E05F 15/60 49/28 |
| 2019/0211610 A1 | * | 7/2019 | Portilla | F41H 5/24 |

FOREIGN PATENT DOCUMENTS

AU 2016222346 B2 3/2018

* cited by examiner

*Primary Examiner* — Daniell L Negron
(74) *Attorney, Agent, or Firm* — Haynes and Boone, LLP

(57) ABSTRACT

A system for detecting a threat at a facility, such as a weapon, and automatically implementing security procedures including opening and/or closing doors of the facility to isolate the threat from facility occupants. Additionally or alternatively, one or more egress routes may be established by opening and/or closing certain doors to aid facility occupants in evacuating the facility while avoiding the threat.

21 Claims, 5 Drawing Sheets

FACILITY ACCESS REGULATING SYSTEM AND METHOD

TECHNICAL FIELD

This disclosure is generally directed to systems and methods for operating security doors in response to detecting a threat.

BACKGROUND

Many buildings and public facilities utilize automated emergency and security technology to prevent injury to occupants. For example, camera systems are used to monitor occupied spaces and automatically display events of interest to security personnel so that they may respond to individuals exhibiting suspicious behavior. Further, fire detection and sprinkler systems react to indications of smoke or fire to extinguish fires quickly upon detection.

However, on-site security systems and personnel are often ill-equipped and unprepared to handle security threats such as terrorist or active shooter scenarios. These situations develop rapidly, and early detection is difficult due to the ease of concealing contraband such as guns and explosives. Frequently, there is little to no time for security systems and personnel to react to security threats before occupants are injured.

Accordingly, there remains a need to automate detection and response to weapons and other illicit items to rapidly deploy reactive measures including isolating a threat and providing egress for occupants.

SUMMARY

The present disclosure provides systems and methods for detecting contraband (e.g., weapons or drugs) at a facility and deploying automated responses including opening or closing barriers within the facility to isolate the threat and provide egress routes or safe lockdowns for occupants, and/or generating alerts to authorities or occupants.

In an aspect of the present disclosure, a system for detecting contraband at a facility includes a first sensor, a controller, a plurality of barriers, and a plurality of barrier actuators. The first sensor may be operable to inspect a target to determine a presence of contraband. The controller may include a processor and a memory and may be in operative communication with the first sensor to receive an indication of contraband from the first sensor in response to the first sensor determining a presence of contraband. The plurality of barriers may be distributed throughout passages of the facility. Each barrier may have at least an open state and a closed state. The plurality of barrier actuators may be in operative communication with the controller. Each barrier actuator may be associated with one or more of the barriers to transition the one or more of the barriers between one of the open state and the closed state to the other of the open state and the closed state. In response to the indication of contraband, the controller may be operable to determine a desired state of each barrier and transmit a control signal to the plurality of barrier actuators to manipulate each barrier into a respective desired state. The desired state of at least a first barrier of the plurality of barriers may be the closed state and the desired state of at least a second barrier of the plurality of barriers may be the open state.

In some embodiments, the first barrier may be selectably lockable when in the closed state in response to a locking signal from the controller. The first barrier may be disposed proximate to the first sensor and configured to prevent the target from accessing a portion of the facility disposed on a side of the first barrier opposite from the sensor when locked in response to the indication of contraband. The second barrier may be disposed remote from the first sensor on a side of the portion of the facility opposite from the first barrier. The first barrier and a third barrier of the plurality of barriers may define a region of the facility in which the first sensor is disposed, and the third barrier may be disposed on an opposite side of the sensor from the first barrier. The third barrier may be selectably lockable to isolate the target within the region when the first barrier and the third barrier are locked.

In some embodiments, the processor of the controller may be configured to dynamically determine the desired state of each barrier based upon the indication of contraband and at least one other factor. The at least one other factor may include a type of the contraband, a location of an occupant of the facility, a location of the first sensor, a location of a second sensor associated with a second indication of contraband, a location of security or law enforcement personnel, a location of the target, a location of a secure area, and a location of an egress point remote from the first sensor. In other embodiments, the desired state of each barrier may be provided in a preprogrammed set of barrier states stored in the memory of the controller.

In further embodiments, the controller may be configured to generate, in response to the indication of contraband, an alert comprising at least one of a visual alert to occupants of the facility, an audible alert to occupants of the facility, a remote alert to a facility administrator, and a remote alert to law enforcement personnel.

A variety of mechanical controls are envisioned for the barrier actuators. For example, at least one of the plurality of barrier actuators may include a spring-driven mechanism configured to bias at least one barrier to the open state or the closed state. At least one of the plurality of barrier actuators may include an electric motor-driven mechanism to transition a respective barrier between states.

It is contemplated that a wide variety of sensors may be utilized including sensors which can detect contraband including at least one of a gun, a knife, an explosive device, an explosive substance, narcotics, a chemical agent, a biological agent, or a volatile organic. More specifically, contraband detectable by sensors according to the present disclosure may include at least one of nitrate ester, peroxide, acrylonitrile, acetonitrile, aliphatic nitro, nitramine, chloroform, or aromatic nitro.

In some embodiments, the first sensor may include a camera-based recognition sensor programmed to visually determine the presence of contraband. In other embodiments, the first sensor may include a radiofrequency transceiver configured to determine the presence of contraband. The radiofrequency transceiver may include a microwave radar or ultra-wideband transceiver, and the controller may be configured to determine the presence of contraband by analyzing a late time response of radiofrequency waves transmitted toward the target. The memory of the controller may include a database of previous scans of targets, each previous scan including late time response data and a classification indicating threat or non-threat based upon whether or not contraband was present on a respective target associated with each previous scan. In this regard, the controller may be configured to determine the presence of contraband by comparing the late time response of the radiofrequency waves transmitted toward the target with the previous scans to determine whether the late time response resembles late time responses of previous scans classified as threat or late time responses of previous scans classified as non-threat.

In other embodiments, the first sensor may include a passive electronic sensor configured to detect an electronic signature associated with specific types of contraband. In still further embodiments, the first sensor may include an airborne molecule detection sensor configured to detect low-concentrations of contraband molecules in air near the target. The airborne molecule detection sensor may be configured to apply a bias voltage to a regenerative nano-textured sensing element and monitor an output of the sensing element for changes indicative of contraband molecules interacting with the sensing element.

In some embodiments, an override system may be configured to prevent the controller from sending a control signal to the plurality of barrier actuators when a target associated with the presence of contraband is determined to be an authorized contraband carrier. An authorized contraband carrier may be a security or law enforcement officer transporting contraband such as a weapon or explosive substance. A target may be determined to be an authorized contraband carrier based upon credentials including at least one of a law enforcement badge, an RFID badge, a password, or facial recognition.

In another aspect, a facility access regulating system may include a sensor operable to inspect a target to detect contraband, a controller in operative communication with the sensor to receive an indication of detected contraband from the sensor in response to the sensor detecting contraband, a barrier in a facility having at least an open state and a closed state, and a barrier actuator in operative communication with the controller. The barrier actuator may be associated with the barrier to transition the barrier between one of the open state and the closed state to the other of the open state and the closed state. In response to the indication of contraband, the controller may be operable to determine a desired state of the barrier and transmit a control signal to the barrier actuator to move the barrier into the desired state. The desired state of the barrier may be the open state, the closed state, or the secure state.

In another aspect of the present disclosure, a system for detecting contraband at a facility may include a sensor, a controller, a plurality of barriers, and a plurality of barrier actuators. The sensor may be operable to inspect a target to determine a presence of contraband. The controller may have a processor and a memory and may be in operative communication with the sensor to receive an indication of contraband from the sensor in response to the sensor determining a presence of contraband. The plurality of barriers may be distributed throughout passages of the facility and each barrier may have at least an open state and a secure state. The secure state may include both a closed state and a locked state. The plurality of barrier actuators may be in operative communication with the controller. Each barrier actuator may be associated with one or more of the barriers to transition the one or more of the barriers to the secure state or the open state. In response to an indication of contraband, the controller may be operable to determine a desired state of each barrier and transmit a control signal to the plurality of barrier actuators to manipulate each barrier into a respective desired state. The desired state of at least a first barrier of the plurality of barriers may be the secure state and the desired state of at least a second barrier of the plurality of barriers may be the secure state. The second barrier may be disposed on a side of the first barrier that is opposite a side of the first barrier on which the sensor is disposed.

In some embodiment, the desired state of a third barrier may be the open state. The third barrier may be disposed such that when open the third barrier provides occupants access to an egress route from the facility which avoids the target.

In another aspect of the present disclosure, a method for regulating access in a facility includes inspecting a target at the facility with a first sensor; detecting, based on the inspecting, contraband associated with the target; transmitting, in response to the detecting, an indication of contraband from the first sensor to a controller in operative communication with the first sensor; determining a desired state of each of a plurality of barriers in the facility, each barrier having at least an open state and a closed state; and transmitting a control signal from the controller to at least one barrier actuator of a plurality of barrier actuators. Each barrier actuator of the plurality of barrier actuators may be associated with a barrier of the plurality of barriers to transition the respective barrier between one of the open state and the closed state to the other of the open state and the closed state. The desired state of at least a first barrier of the plurality of barriers may be the closed state and the desired state of at least a second barrier of the plurality of barriers may be the open state. The control signal may include an instruction for the barrier actuator associated with the first barrier to move the first barrier into the closed state.

In an embodiment, the method may further include locking the first barrier in response to the indication of contraband. The first barrier may be disposed proximate to the first sensor and configured to prevent the target from accessing a portion of the facility disposed on a side of the first barrier opposite from the sensor when locked. The second barrier may be disposed remote from the first sensor on a side of the portion of the facility opposite from the first barrier. The first barrier and a third barrier of the plurality of barriers may define a region of the facility in which the first sensor is disposed. The third barrier may be disposed on an opposite side of the sensor from the first barrier. The method may further include locking the third barrier in response to the indication of contraband. The third barrier may be selectably lockable to isolate the target within the region when the first barrier and the third barrier are locked.

In another embodiment, the determining may be performed dynamically at a processor of the controller based upon the indication of contraband and at least one other factor. The at least one other factor may include: a type of the contraband; a location of an occupant of the facility; a location of the first sensor; a location of a second sensor associated with a second indication of contraband; a location of security or law enforcement personnel; a location of the target; a location of a secure area; and a location of an egress point remote from the first sensor.

In another embodiment, the controller may include memory and the desired state of each barrier may be provided in a preprogrammed set of barrier states stored in the memory. The determining may include referencing the preprogrammed set.

In yet other embodiments, the method may include generating, with the controller and in response to the indication of contraband, an alert comprising at least one of a visual alert to occupants of the facility, an audible alert to occupants of the facility, a remote alert to a facility administrator, and a remote alert to law enforcement personnel.

Various actuation mechanisms are contemplated for the barrier actuators. For example, at least one of the plurality of barrier actuators may include a spring-driven mechanism configured to bias at least one barrier to the open state or the closed state. A latch may be released in response to a control signal to permit the bias of the spring to manipulate the state of the barrier. Further, a least one of the plurality of barrier actuators may include an electric motor-driven mechanism to transition a respective barrier between states.

In an embodiment, the contraband may include at least one of a gun, a knife, an explosive device, an explosive substance, narcotics, a chemical agent, a biological agent, or a volatile organic, nitrate ester, peroxide, acrylonitrile, acetonitrile, aliphatic nitro, nitramine, chloroform, or aromatic nitro.

In another embodiment, the first sensor may be a camera-based recognition sensor and the detecting may include visually identifying contraband by comparing at least one image frame from the camera-based recognition sensor with a database comprising contraband imagery.

In an embodiment, the first sensor may be a radiofrequency transceiver and the detecting may include transmitting a radiofrequency wave toward the target with a transmitter of the transceiver; collecting reflected radiofrequency waves with a receiver of the transceiver; analyzing, with the controller, the reflected radiofrequency waves; and calculating a probability of contraband being present. The radiofrequency transceiver may include a microwave radar or ultra-wideband transceiver. The analyzing may include analyzing a late time response of the reflected radiofrequency waves. The controller may include memory which includes a database of previous scans of targets, each previous scan including late time response data and a classification indicating threat or non-threat based upon whether or not contraband was present on a respective target associated with each previous scan. In this regard, the calculating the probability may include comparing the late time response of the reflected radiofrequency waves with the previous scans to determine whether the late time response resembles late time responses of previous scans classified as threat or late time responses of previous scans classified as non-threat.

In yet another embodiment, the first sensor may be a passive electronic sensor and the detecting may include identifying an electronic signature associated with an explosive or flammable substance. In this regard, certain substances are known to have specific electronic signatures. By identifying one of these specific signatures, the source can be determined.

In another embodiment, the first sensor may be an airborne molecule detection sensor and the detecting may include sensing low-concentrations of contraband molecules in air near the target. For example, contraband molecules may include at least one of an explosive substance, a flammable substance, a narcotic, a chemical agent, a biological agent, or a volatile organic. The sensing may include applying a bias voltage to a regenerative nano-textured sensing element and monitoring an output of the sensing element for changes indicative of contraband molecules interacting with the sensing element.

In yet another embodiment, the method may include preventing, using an override system, the controller from sending the control signal when a target associated with the contraband is determined to be an authorized contraband carrier. The override system may be incorporated into the controller or may be a separate component. The authorized contraband carrier may be, for example, a security or law enforcement officer and the contraband may be, for example, a weapon or explosive substance. The method may further include determining the authorized contraband carrier is authorized based upon credentials including at least one of a law enforcement badge, an RFID badge, a password, or facial recognition.

In an aspect of the present disclosure, a facility access regulating system may include a sensor, a controller, a first barrier actuator, and a second barrier actuator. The sensor may be configured to inspect a target to detect contraband. The controller may be configured to communicate with the sensor to receive an indication of contraband from the sensor. The first barrier actuator and second barrier actuator may each be configured to communicate with the controller. In response to receiving the indication of contraband, the controller may be configured to determine a desired state of each barrier of a facility and transmit a control signal to the first and second barrier actuators to manipulate at least one barrier into a desired state.

In another aspect of the present disclosure, a method for regulating access in a facility may include: inspecting a target at the facility with a sensor; detecting, based on the inspecting, contraband associated with the target; transmitting an indication of contraband from the sensor to a controller; determining a desired state of each of a plurality of barriers in the facility, each barrier having at least an open state and a closed state; and transmitting a control signal from the controller to at least one barrier actuator of a plurality of barrier actuators. Each barrier actuator may be associated with a respective barrier of the plurality of barriers to manipulate the respective barrier into a respective desired state. The desired state of a first barrier of the plurality of barriers may be the closed state and the desired state of a second barrier of the plurality of barriers may be the closed state. The second barrier may be disposed on a first side of the first barrier and the sensor may be disposed on an opposing second side of the first barrier.

In an embodiment, the desired state of a third barrier may be the open state. The third barrier may be disposed such that, when open, the third barrier provides occupants access to an egress route from the facility which avoids the target.

In another embodiment, at least one of the plurality of barrier actuators may include a spring-driven mechanism configured to bias at least one barrier to the open state or a closed state. At least one of the plurality of barrier actuators may include an electric motor-driven mechanism to transition a respective barrier between states.

In an embodiment, the sensor may be a camera-based recognition sensor and the detecting may include visually identifying contraband by comparing at least one image frame from the camera-based recognition sensor with a database comprising contraband imagery.

In another embodiment, the sensor may be a radiofrequency transceiver and the detecting may include: transmitting a radiofrequency wave toward the target with a transmitter of the transceiver; collecting reflected radiofrequency waves with a receiver of the transceiver; and analyzing, with the controller, the reflected radiofrequency waves; and calculating a probability of contraband being present. The sensor may include a microwave radar or ultra-wideband transceiver. The analyzing may include analyzing a late time response of the reflected radiofrequency waves. The controller may include memory having a database of previous scans of targets, each previous scan including late time response data and a classification indicating threat or non-threat based upon whether or not contraband was present on a respective target associated with each previous scan. In this regard, the calculating the probablity may include comparing the late time response of the reflected radiofrequency waves with the previous scans to determine whether the late time response resembles late time responses of previous scans classified as threat or late time responses of previous scans classified as non-threat.

In another embodiment, the sensor may be a passive electronic sensor and the detecting may include identifying a known electronic signature associated with an explosive or flammable substance.

In yet another embodiment, the sensor may be an airborne molecule detection sensor and the detecting may include sensing low-concentrations of contraband molecules in air near the target. The contraband molecules may include at least one of an explosive substance, a flammable substance, a narcotic, a chemical agent, a biological agent, or a volatile organic. The sensing may include applying a bias voltage to a regenerative nano-textured sensing element and monitoring an output of the sensing element for changes indicative of contraband molecules interacting with the sensing element.

In another embodiment, the method may include preventing, using an override system, the controller from sending the control signal when a target associated with the contraband is determined to be an authorized contraband carrier. The authorized contraband carrier may be a security or law enforcement officer and the contraband includes a weapon or explosive substance. The target may be determined to be authorized based upon credentials including at least one of a law enforcement badge, an RFID badge, a password, or facial recognition.

In yet another embodiment, the method may include determining, prior to the transmitting the control signal, a current state of each barrier, wherein the current state comprises the open state or the closed state. The determining the current state of each barrier may include transmitting, from each barrier actuator to the controller, a current state of the respective barrier. The control signal may include instructions for the at least one barrier actuator based upon the current state of the barrier associated with the at least one barrier operator being the open state. Further, the control signal may omit instructions for barrier actuators associated with barriers for which the current state matches the desired state. The transmitting the current state may be performed, e.g., in response to a query signal sent from controller to the barrier actuators, periodically, automatically upon a user manipulating a door into a different state, etc.

In another aspect of the present disclosure, a method for regulating access in a facility may include: inspecting a target at the facility with a sensor; detecting, based on the inspecting, contraband associated with the target; transmitting, in response to the detecting, an indication of contraband from the first sensor to a controller; transmitting a first control signal from the controller to a first barrier actuator, the first barrier actuator associated with a first barrier; and transmitting a second control signal from the controller to a second barrier actuator associated with a second door. The control signal may instruct the first barrier actuator to close the first barrier. In this regard, the first barrier may be disposed between the target and occupants of the facility such that closing it isolates the target. The second control signal may include an instruction for the second barrier actuator to open the second barrier. The second barrier may be disposed within an egress route for the occupants to provide a route to safety. Notably, the first control signal may be the same control signal as the second control signal. In this regard, the control signal may be sent to all barrier actuators or all barrier actuators that need to change their current state. Alternatively, the first control signal may be distinct from the second control signal and each control signal may be sent only to a respective barrier actuator.

In another aspect, a facility access regulating system may include a memory, a processor, and a transmitter. The memory may be configured to store a program for determining a course of action in response to receipt of an indication of contraband at a controller from a sensor. The processor may be in operative communication with the memory and configured to execute the program to generate instructions. The transmitter may be configured to send the instructions to at least one barrier actuator of a facility configured to regulate at two states of at least one barrier. The instructions may include a desired state of the at least one barrier to facilitate the prevention of a target associated with contraband from accessing a portion of the facility, or providing an egress route for an occupant of the facility.

In some embodiments, the system may include the sensor which is configured to detect the contraband. In this regard, it is contemplated that in some embodiments, a controller and a sensor may be formed as a single unit or system. For example, the processor, memory, and transmitter described herein as performing the functions of a controller may be housed inside a sensor body which also houses a sensor. Such an embodiment may be advantageous in reducing the footprint of the controller and sensor, particularly in installations in existing facilities.

In some embodiments, the at least one barrier actuator may include a first barrier actuator and a second barrier actuator. The at least one barrier may include a first barrier associated with the first barrier actuator and a second barrier associated with the second barrier actuator. A desired state of the first barrier may be closed and a desired state of the second barrier may be open. The instructions include a single set of instructions sent by the transmitter to both the first barrier actuator and the second barrier actuator, or the instructions may include a first instruction sent only to the first barrier actuator and a second instruction sent only to the second barrier actuator. In this regard, each instruction may be direct addressed to the respective barrier actuator. Additionally or alternatively, a single set of instructions may be sent to each barrier actuator and the barrier actuators may identify the respective instruction associated with that particular barrier actuator, for example, by referencing a barrier identifier and associated state in the set of instructions.

It is contemplated that a system according to the present disclosure may be configured for retrofitting an existing facility for regulating access as described herein. In this regard, a system (or kit) may include any of a range of components depending upon whether existing components of the facility are suitable or if new/additional components are desired. For example, some facilities may be equipped with security doors and automated actuators, but may need a controller and sensor for regulating access in accordance with the present disclosure. In another example, barrier actuators may be included in a system, the barrier actuators configured for installation on existing barriers (e.g., doors) of the facility. In this regard, a barrier actuator may optionally include a mechanism for locking the barrier when the barrier is in a closed state. A system may include at least one barrier actuator and at least one barrier, for example, configured for installation within an existing portal of a facility to add a new barrier or replace an existing barrier. It should also be appreciated that some systems may be configured for installation in new construction.

In an aspect of the present disclosure, a facility access regulating system may include a sensor configured to inspect a target to detect contraband, a controller configured to communicate with the sensor to receive an indication of contraband from the sensor, a first barrier actuator, and a second barrier actuator configured to communicate with the controller. In response to receiving the indication of contraband, the controller may be configured to determine a desired state of each barrier of a facility and transmit a control signal to the first and second barrier actuators to manipulate at least one barrier into a desired state. The desired state may be the secure state, the closed state, or the open state. At least one of the first and second barrier actuators may include a spring-driven mechanism configured to bias a respective barrier to the open state or a closed state. Additionally or alternatively, at least one of the first and second barrier actuators may include an electric motor-driven mechanism to transition a respective barrier between states.

In another aspect of the present disclosure, a facility access regulating system includes a memory, a processor, and a transmitter. The memory may be configured to store a program for determining a course of action in response to receipt of an indication of contraband from a sensor. The processor may be in operative communication with the memory and configured to execute the program to generate instructions. The transmitter may be configured to send the instructions to at least one barrier actuator of a facility configured to regulate at least two states of at least one barrier (e.g., open state, closed state, or secure state). The instructions may include a desired state of the at least one barrier to facilitate at least one of: preventing a target associated with contraband from accessing a portion of the facility; and providing an egress route for an occupant of the facility. The system may optionally include the sensor which is configured to detect the contraband.

In some embodiments, the at least one barrier actuator may include a first barrier actuator and a second barrier actuator and the at least one barrier may include a first barrier associated with the first barrier actuator and a second barrier associated with the second barrier actuator. A desired state of the first barrier may be closed and a desired state of the second barrier may be open.

In some embodiments, the instructions may include a single set of instructions sent by the transmitter to both the first barrier actuator and the second barrier actuator. Alternatively, the instructions may include a first instruction sent only to the first barrier actuator and a second instruction sent only to the second barrier actuator.

In another aspect of the present disclosure, a facility access regulating system may include a sensor and a controller. The sensor may be configured to detect contraband including at least one of a knife, a gun, an explosive device, an explosive substance, a narcotic, a chemical agent, a biological agent, or a volatile organic. The controller may include a memory, a processor, and a transmitter. The memory may be configured to store a program for determining a course of action in response to receipt of an indication of contraband from the sensor. The processor may be in operative communication with the memory and configured to execute the program to generate instructions. The transmitter may be configured to send the instructions to at least one barrier actuator of a facility configured to regulate at least two states of at least one barrier. The instructions may include a desired state of the at least one barrier to facilitate at least one of: preventing a target associated with contraband from accessing a portion of the facility; and providing an egress route for an occupant of the facility. The sensor may include one or more of a camera-based recognition sensor, a passive electronic sensor, an airborne molecule detection sensor, and a radiofrequency transceiver, although any suitable sensor for detecting contraband may be utilized.

In some embodiments, the system may include at least one barrier actuator configured for engagement with an existing barrier of the facility. The at least one barrier actuator may include a mechanism for locking the barrier when the barrier is in a closed state.

In other embodiments, a system may include the at least one barrier actuator and the at least one barrier. The at least one barrier may be configured for installation within an existing portal (e.g., doorway, walkway, hall, etc.) of the facility.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following.

BRIEF DESCRIPTION OF THE DRAWINGS

The accompanying drawings illustrate implementations of the systems, devices, and methods disclosed herein and together with the description, serve to explain the principles of the present disclosure.

Figure 1:
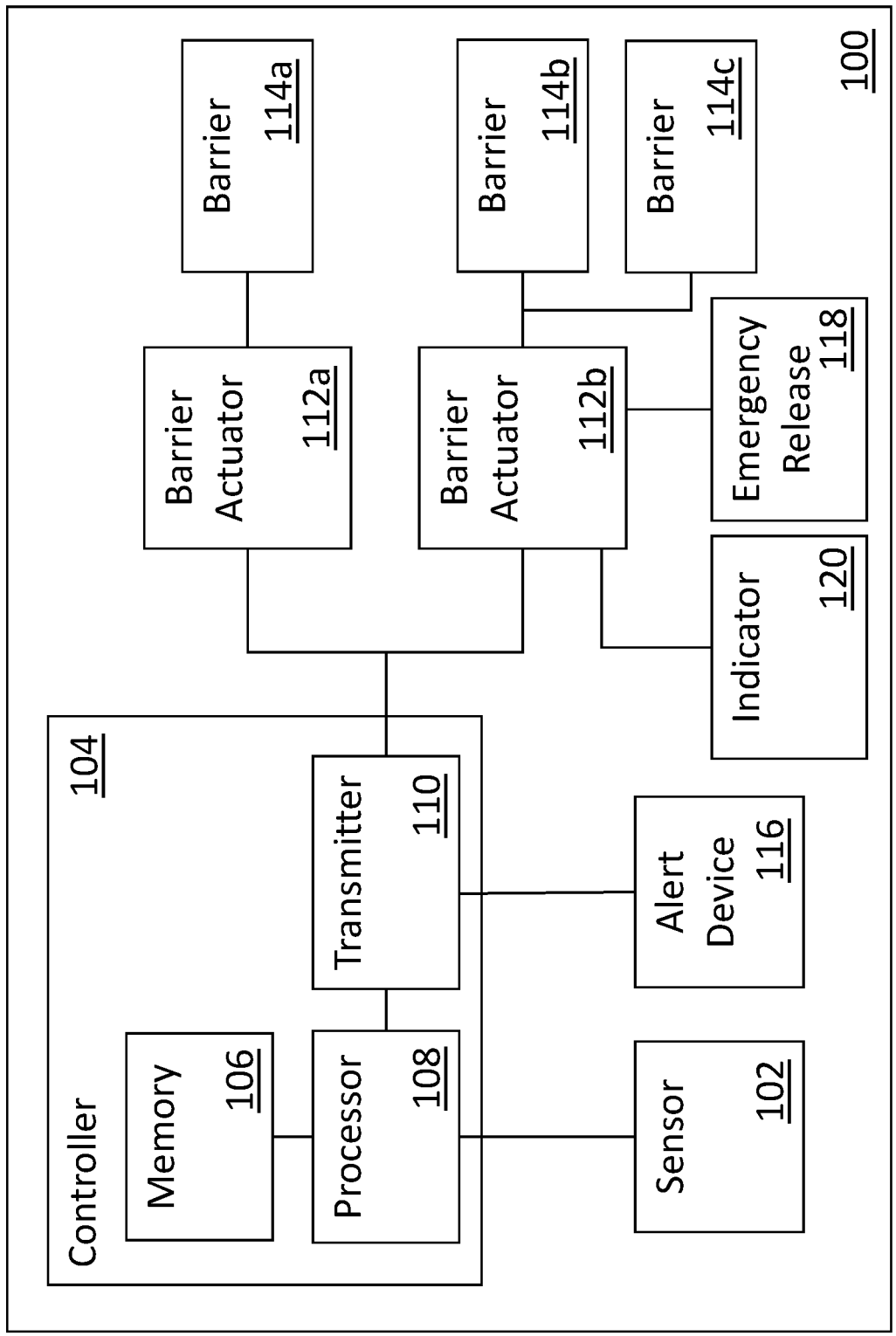
FIG. 1 is a block diagram of a system for securing a facility according to an exemplary implementation of the present disclosure.

These Figures will be better understood by reference to the following detailed description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

The present disclosure is directed to utilities for detecting contraband on a target (e.g., vehicle, a person, or any device) at a facility and, in response, implementing an emergency procedure. Facilities that are contemplated as being within the scope of the present disclosure include any building, park, stadium, arena, or other location at which access and movement within such facility may be prevented, limited, or permitted using movable barriers.

The term "contraband" is used herein to refer to any illicit substance or device which may be detectable by the sensors discussed below. Those sensors may scan, assess, evaluate, or otherwise inspect a "target" which can be a vehicle, a person, or any device which may attempt to enter a facility while carrying contraband, or may be contraband itself prior to detection. Once it is determined that a target likely contains or possesses contraband, that target is generally referred to as a "threat."

An emergency procedure which is implemented upon detecting contraband may include closing, opening, and/or locking of certain barriers (e.g., doors, windows, gates, or any other device which may permit or prevent access to a facility) to isolate the threat, to deny access to a threat, to provide egress from the facility for non-threat occupants, to provide routing for non-threat occupants to a safe location, or a combination of these or other related or similar functions.

FIG. 1 shows an exemplary embodiment of a system 100 in accordance with the present disclosure. A controller 104 may comprise memory 106, processor 108, and transmitter 110. Sensor 102 may be operable to scan a target and determine, with or independent of the controller 104, a presence of contraband on a target. In response, sensor 102 may send an indication of contraband, which may identify the type of contraband, to the controller 104. The memory 106 may store a program for processing input from sensor 102 to determine a suitable course of action in response to an indication of contraband provided by the sensor 102. In some instances, the course of action may be preprogrammed and stored in the memory, and in some instances the course of action may be determined using a variety of factors and one or more algorithms stored in the memory. A course of action may include generating an alert such as a remote alert to be sent via a telecommunications medium to authorities such as law enforcement or security personnel, a building administrator, etc. Additionally or alternatively, a local alert may be generated on a local alert device 116, such as a speaker, lights, panels, displays, or other visual or audible indicators within the facility. These may include, for example, strobes and/or a siren or commands or other alert indicators. Furthermore, a course of action may include automatically initiating a live camera feed to display on a monitor, either locally disposed onsite such as on an administrator's computer, or remotely, such as at a police station or security monitoring facility. Alert device 116, which may facilitate the described alerts, may be in operative communication with transmitter 110, another transmitter (not shown), or with another component of controller 104 such as processor 108.

Upon selection of a course of action using the processor 108, the transmitter 110 may transmit a control signal to one or more barrier actuators 112 for manipulation of associated barriers 114. The transmitter may be any suitable device for communicating to barrier actuators such as a wireless radiofrequency transmitter, UV light transmitter, I/O port, etc. The barrier 114 may be a door, gate, turnstile, bollard, beam or arm, or other barrier. The control signal may be sent wirelessly, in which case each barrier actuator 112 may include an antenna for receipt of the control signal, or the control signal may be sent via a wired connection. In some embodiments, some barrier actuators may be wired and others may be wireless.

In some embodiments, a single control signal may be sent from controller 104 to all applicable barrier actuators 112. In this regard, the single control signal may include instructions for each barrier actuator 112 of the system, each instruction including an identifier associated with a specific barrier actuator and one or more desired states of each barrier 114. In other embodiments, a plurality of control signals may be transmitted by transmitter 110, each control signal addressed to a specific barrier actuator 112 or group thereof.

In an embodiment, each barrier actuator 112 may include or be associated with a transmitter for sending a status signal to controller 104. As indicated above, transmitter 110 may be a transceiver configured for two-way communication with the barrier actuators. Barrier actuators 112 may transmit their current state (e.g., open, closed and unlocked, or closed and locked) at periodic intervals, upon each change in state, or in response to a query from controller 104.

Each barrier actuator 112 may include an electric motor or servo, a pneumatic or hydraulic linear actuator, a biasing spring, or a combination thereof. Barriers utilizing a biasing spring may be biased toward either the open state or closed state such that a motor or actuator must overcome the biasing force to move barrier to the other of the open or closed states. Some barriers 114 may be gravity-driven such that they are stored in a position with gravitational potential energy and can be released by a barrier actuator 112 to allow a bottom edge of the barrier to fall to the ground. Each barrier actuator 112 may include a locking mechanism to secure a respective barrier 114 in the closed state, or in some instances the open state. In this regard, a locking mechanism and a motor or actuator may both be controlled by a barrier actuator 112 or a locking mechanism may itself comprise a separate barrier actuator 112 configured to control a lock or latch.

Any suitable number of barriers and/or barrier actuators may be utilized. Barriers may be associated with common portals such as doorways into rooms or may be installed for the purpose of implementing utilities of the present disclosure. For example, a barrier may be installed in a hallway for the sole purpose of providing an isolating means during an emergency such as detected firearm. Moreover, various types of barriers may be utilized. For example, reinforced barriers such as bulletproof or blast-proof doors may be provided at locations near a sensor as this is the location at which a target is most likely to be isolated following an indication of contraband. Further, secure areas such as safe rooms may be provided at locations within a facility and away from ingress/egress points and may also have reinforced barriers for securing occupants during a lockdown. Due to the increased expense associated with reinforced barriers, especially when retrofitting existing facilities, it may be desirable to use non-reinforced barriers such as standard doors (e.g., glass sliding doors, hinged doors, sliding windows, etc.) at some locations within a facility. Despite providing a limited amount of protective shielding, such non-reinforced barriers may nevertheless be valuable for routing occupants to safety during an emergency. That is, barriers leading to unsafe locations may be closed automatically in response to an indication of contraband whereas barriers leading out of the facility or toward a safer location may be opened. Routing occupants in this manner may improve evacuation or sheltering times by providing a clear path to a safe location for occupants without the occupants needing to manually open barriers or evaluate their route, especially given that they may not know the location of the threat.

It should be appreciated that a plurality of sensors may be utilized. For example, there may be one sensor at each entrance to a facility or there may be multiple sensors at a single entrance. In this regard, multiple types of sensors or multiple sensors of the same type may be provided at a single entrance.

Sensor 102 may comprise any type of sensor suitable for detecting contraband. Some exemplary sensors that are contemplated include camera-based recognition sensors, radiofrequency (RF) transceivers, passive electronic sensors, and airborne molecule detection sensors. Sensor 102 may include a processor for processing collected information during the course of scanning a target, or may be hardware without a processor which is configured to utilize the processor 108 of controller 104 for analytics. It should be appreciated that although this disclosure describes certain functions performed at the controller on behalf of the sensor, those functions may be performed at the sensors and the results may be forwarded to a controller for determining a course of action.

Camera-based recognition sensors utilize a camera to capture images and processors to analyze the captured images to determine whether contraband, such as a gun, a knife, or an explosive device, is present within the images. A camera-based recognition sensor may include a memory and a processor to perform recognition tasks within the sensor or an associated piece of hardware and then relay results of the tasks to a controller. Alternatively, the images from the camera may be relayed to a controller and the tasks may be performed by the controller.

Sensors comprising RF transceivers are configured to produce an RF signal, such as a pulse, and monitor received waves arriving at a receiver after reflecting off various surfaces within a given range. Although described as a transceiver, it should be appreciated that an RF transceiver may comprise a transmitter and a receiver which are distinct units. The transmitter and the receiver may even be distributed across a scanning environment rather than co-located.

Often, RF transceiver sensors (or "scanners") "learn" a base line set of data by sending pulses and receiving reflections while the environment (e.g., room) is effectively empty (e.g., no targets to scan) to identify reflection characteristics associated with the environment near the sensor. When performing a scan of a target, the sensor may then subtract, or otherwise compensate for, the base line from the data collected during the scan to isolate the portion of the data collected which is associated with the target. Moreover, an RF scanner may utilize late time response data (or "LTR") to assess the presence of contraband. LTR is received at the receiver after early time response data and is often more effective for positive identification of contraband. Early time data includes waves reflected directly back at the transceiver (or to the receiver in the case of separate transmitter and receiver) upon first collision and waves which have propagated about a medium during a short duration of time thereafter. Early time data may be less accurate for object detection and identification and is often disregarded in RF scanners. These processes of subtracting a base line and/or ignoring early time response may help focus the sensor on the portion of the data which is relevant in detecting the presence of contraband.

From the remaining data, which is presumably associated with the target, the sensor looks for patterns resembling results from previous scans which were identified as containing contraband. For example, when scanning for a firearm, a sensor using an RF transceiver (e.g., microwave radar, millimeter wave, or ultra-wideband) may reference information from previous scans which were indicated as including a firearm and also information from previous scans that were indicated as not including a firearm. The sensor may then assess whether the current scan more closely resembles the former or the latter data. The sensor may even provide a probability assessment indicating the likelihood that a firearm is present. A threshold may be established for generating an alert when the likelihood exceeds the threshold. Sensors utilizing RF transceivers have shown to be effective in detecting many types of contraband including, but not limited to, knives, guns, and explosive devices.

Passive electronic sensors detect electronic signatures associated with certain objects. For example, passive electronic scanners have been used to locate survivors trapped in building rubble after earthquakes or explosions by detecting electronic pulses associated with a heartbeat. Recently, passive electronic sensors have proven to be effective in identifying explosive or flammable substances based upon electronic signatures associated with specific chemical compositions (e.g., gunpowder). Importantly, these devices can be effective through obstacles such as walls and vehicles so that contraband can be detected even when blocked by one or more layers of concealment.

Airborne molecule detection sensors can detect low-concentrations of contraband molecules in air at or near a target. Sensitivities of these sensors have improved dramatically in recent years. In some instances, an explosive substance, a flammable substance, a narcotic, a chemical agent, a biological agent, or a volatile organic may be detectable by an airborne molecule detection sensor at concentrations on the order of parts per billion or even parts per trillion. At such low concentrations, it is even possible to detect contraband which is sealed inside containers within a vehicle or under clothing. Some specific examples of substances which may be detected at low concentration include nitrate ester, peroxide, acrylonitrile, acetonitrile, aliphatic nitro, nitramine, chloroform, and aromatic nitro. In an exemplary airborne molecule detection sensor, a bias voltage is applied to a regenerative nano-textured sensing element and the output is monitored for changes indicative of contraband molecules interacting with the sensing element.

It should be appreciated that the various types of sensors discussed herein are exemplary only and any type of sensor which can detect and/or identify contraband is within the scope of the present disclosure. For example, metal detectors or backscatter X-ray machines may be used. Regardless of the sensor type used for sensor 102, scans may be stored in memory 106 for referencing during subsequent scans. In this regard, a machine-learning or artificial intelligence architecture may be employed to improve the accuracy of scans over time.

As mentioned above, one or more factors may be considered by controller 104 when determining the desired state of one or more doors. A type of the contraband may be utilized based on a potential impact of the type of contraband. For example, the response of system 100 to detection of a bomb may be different than a response to detection of a narcotic. A location of an occupant of the facility may be utilized to assess optimal egress routes out of the building, particularly when multiple occupants are in the facility and it is desirable to route them to a common location. The location of one or more sensors providing an indication of contraband may also be considered to route occupants away from the sensor, at least initially for a period of time during which it can be assumed that the threat is still at or near the sensor location. As the threat traverses through the facility, a course of action may be updated and revised to account for the new location(s) of the threat. The location of the threat may be monitored using video cameras or additional sensors. A location of security or law enforcement personnel or a secure area (such as a safe room) may also be considered by the controller 104 so that if occupants cannot safely be routed out of the facility and away from the threat, they can at least be routed to a location that is considered safer than the one they are currently at. As a further example, a location of an egress point (or exit), staircase, or elevator may be considered when routing occupants. Controllers may even calculate estimated egress times of various routes based on current volume of occupancy as a total or at specific locations within the facility, average egress rates corresponding to various volumes of occupancy, and lengths of egress routes including dimensions of rooms and/or passages (e.g., sidewalks or hallways). In this regard, some occupants may be routed one way while other occupants are routed another way to avoid overcrowding a hallway and slowing down an evacuation.

An emergency release 118, such as a mechanical handle or electrical release switch, may be provided adjacent a barrier to allow occupants to override a barrier actuator that has closed and/or locked a barrier. Actuating the emergency release 118 may allow an occupant to manually open the associated barrier or may trigger the barrier actuator to open the barrier. In this regard, emergency release 118 may be used by an occupant to override a state of a barrier as may be desirable to escape a fire or other hazard in the facility. Further, emergency release 118 may allow occupants to take an egress route other than a route initiated by controller 104. Emergency release may be in operative communication with barrier actuator 112b to manipulate a state of barrier 114b or 114c, or may be a part of or in operative communication directly with barrier 114b or 114b.

Indicator 120 may be disposed adjacent a barrier or emergency release to provide an indication to occupants of a current state of a barrier. Indicator 120 may be audible or visual. In one example, indicator 120 is a light which provides a visual indication to occupants that the barrier is secured due to a threat having been detected. In this regard, an occupant may be warned against activating emergency release 118 due to proximity of a threat. As another example, indicator 120 may include a voice recording that is played when an emergency release is actuated. Upon repeated actuation of the emergency release and completion of the voice recording, the barrier may be opened.

Furthermore, indicator 120 may provide a distant indication to occupants navigating a facility. In this regard, an "off" state of indicator 120 may signal to an occupant that the associated barrier is unlocked while an "on" state of indicator 120 may signal that the associated barrier is locked. Alternatively, indicators may always be "on" but may have color-coded indicator lights to convey a status such as red for "locked" and green for "unlocked." In the latter regard, an occupant may be enabled to make routing decisions based on indicators. That is, an occupant may be cued to avoid a first barrier based on an indicator which signals a locked state and move toward a second barrier based on its associated indicator which signals an unlocked state.

Figure 2:
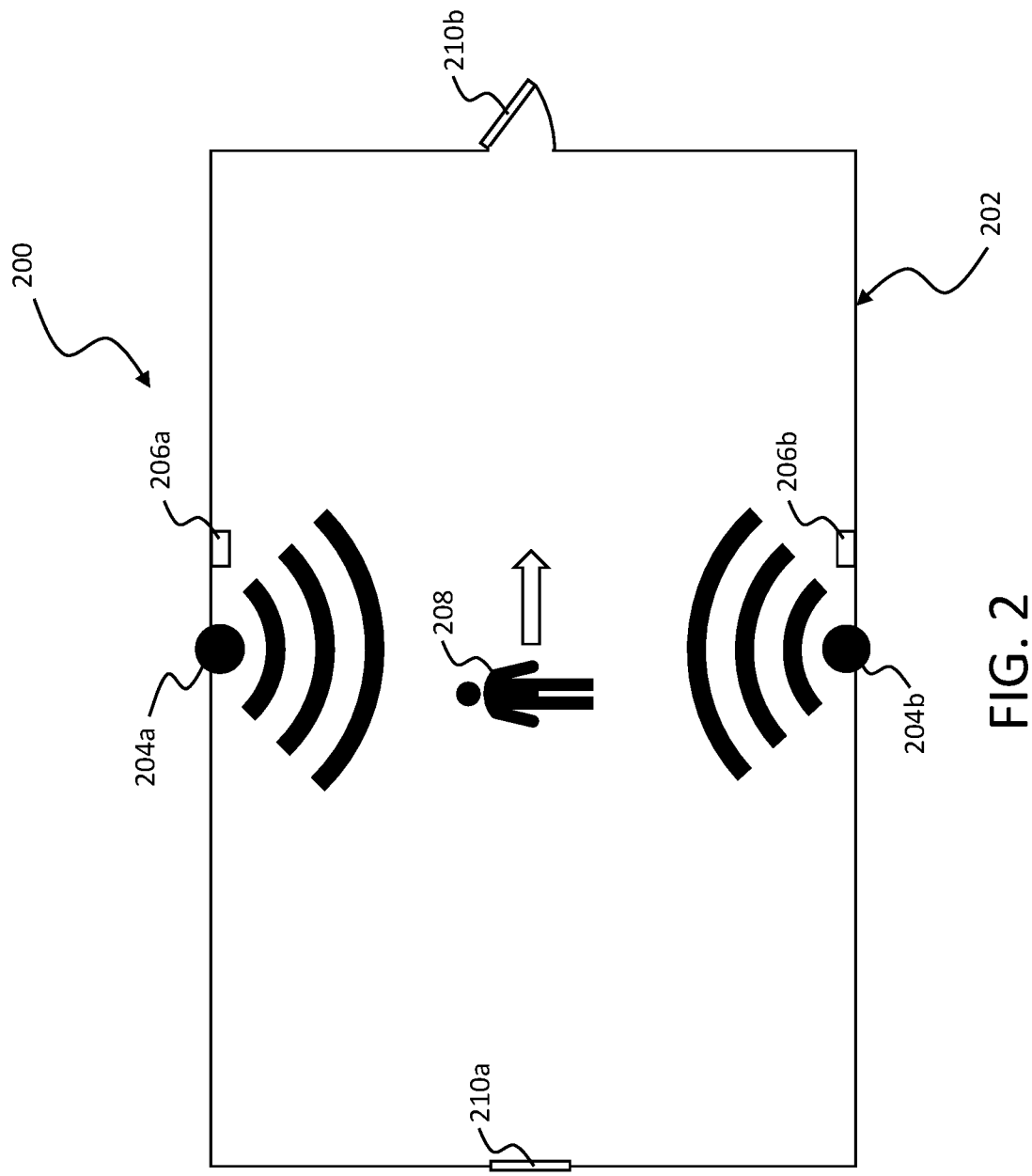
FIG. 2 illustrates an exemplary system for securing a facility according to an exemplary implementation of the present disclosure.

Turning to FIG. 2, an exemplary system 200 for detecting and responding to contraband is illustrated. Room 202 may be, for example, a vestibule or entryway into a public building such as a school or office complex. Barrier 210a, which is a door, may separate the room 202 from outdoors and barrier 210b, which is also a door, may separate the room 202 from the interior of the facility. Sensors 204a, 204b may each be associated with a controller 206a, 206b as shown, or a single controller may be in communication with multiple sensors. Moreover, each sensor 204a, 204b may be associated with a local controller and a central controller may be disposed remotely such as in an administrative office of the facility or remotely (e.g., cloud processing). In such an embodiment, the central controller may perform the functions described in relation to controller 104 of FIG. 1 and the local controllers may provide local signal processing and may be considered a component of the sensor 102 of FIG. 1. In any regard, any number of sensors may be utilized and the two sensors 204a, 204b illustrated in FIG. 2 are exemplary only. Furthermore, although the sensors 204a, 204b are depicted as being mounted to interior walls of the room 202, it should be appreciated that sensors may be mounted within a wall (e.g., passive electronic sensors which can detect through obstacles), on or within a floor or ceiling, within a portable housing such as a cart, handheld wand, doorframe, etc., or within a portion of a barrier such as a door panel, doorframe, doorjamb, turnstile or window sill.

At the point in time illustrated, target 208 has entered the room 202 and barrier 210a has closed behind the target due to a biasing mechanism. Barrier 210b remains open for entry into the facility. As the target 208 walks through the room 202, sensors 204a, 204b scan the target 208 for contraband. In the event that no contraband is detected, the target 208 may continue into the facility without incident. In some embodiments, the sensors 204a, 204b may even be concealed such that the target 208 is unaware of their presence. In the event that contraband is detected (rendering the target 208 a threat), the controllers or a central controller may proceed to determine a course of action. In the case of a simple system which utilizes sensors capable of detecting only a single type of contraband, for example, a weapon, and which does not include any additional sensors, cameras, or other occupant tracking within the facility, there may be only a single preprogrammed course of action, such as a lockdown. The lockdown may result in the controllers ensuring barriers 210a and 210b are both closed and locked using a control signal transmitted to barrier actuators associated with the respective barriers. Closing and locking both barriers 210a, 210b may prevent the threat from accessing the facility and may also prevent the threat from running away as they will become isolated within the room 202 until, for example, law enforcement personnel arrive to handle the threat. This type of preprogrammed course of action may be appropriate, for example, at a facility associated with a low risk of harm if the threat is detained on site. For example, a warehouse may have a limited number of employees on site, if any, such that it is desirable to detain the threat even though they may engage in violent activity. That is, the contraband may be a firearm and the threat may attempt to shoot through the barrier 210a to escape. In low risk facilities, this may be acceptable. In contrast, if the facility is a school, the preprogrammed course of action may include leaving barrier 210a unlocked or open so that the threat may leave before becoming violent.

In a more sophisticated system, the controller or controllers 204a, 204b may initiate a dynamic response based on multiple factors to be considered in determining an optimum course of action. For example, a response to an indication of contraband may differ depending on a type of contraband detected. That is, at a school, a response to an airborne molecule detection sensor detecting a narcotic may include isolating the target 108 in the room 202 and alerting an on-site security officer. Other occupants of the facility may not even be notified of the event. In contrast, a response to the same sensor detecting an explosive device may result in locking barrier 210b, leaving barrier 210a open to urge the threat away from the facility, generating a remote alert to law enforcement, generating a local alert to occupants, and routing occupants to safe areas away from the threat.

Even in the instance of a preprogrammed course of action, the automated processes implemented by sensors, controllers, and barrier actuators of the present disclosure may advantageously provide expedited reaction to security threats during emergencies in which fractions of a second can be invaluable in preserving life. Moreover, more sophisticated systems of the present disclosure may provide even further advantages over known systems such as dynamic responses which alter courses of action in response to variable factors and/or changing circumstances. For example, occupants may be routed toward one location by opening doors along a corridor until it is determined that the threat has moved or another threat has been detected at another entrance, in which case the occupants can be re-routed to another secure area.

In some instances, it may be appropriate to provide an override system which prevents the controller from sending control signals to barrier actuators or generating alerts when a target associated with detected contraband is determined to be an authorized contraband carrier. An override system may include a camera monitored by a person, a camera supplying images to a video recognition processor for facial recognition or credential (e.g., badge) recognition, a credential card reader (e.g., magnetic strip scanner or RFID reader), a keypad for receiving a password or code from a target, etc. Upon determining that a target is an authorized contraband carrier, controller responses may be suppressed. As an example, a sensor may detect gunpowder in a police officer's firearm but the override system may employ a camera to detect the officer's badge and/or uniform and instruct the controller to permit access and refrain from generating alerts, initiating a lockdown, sending control signals to barrier actuators, etc.

Figure 3:
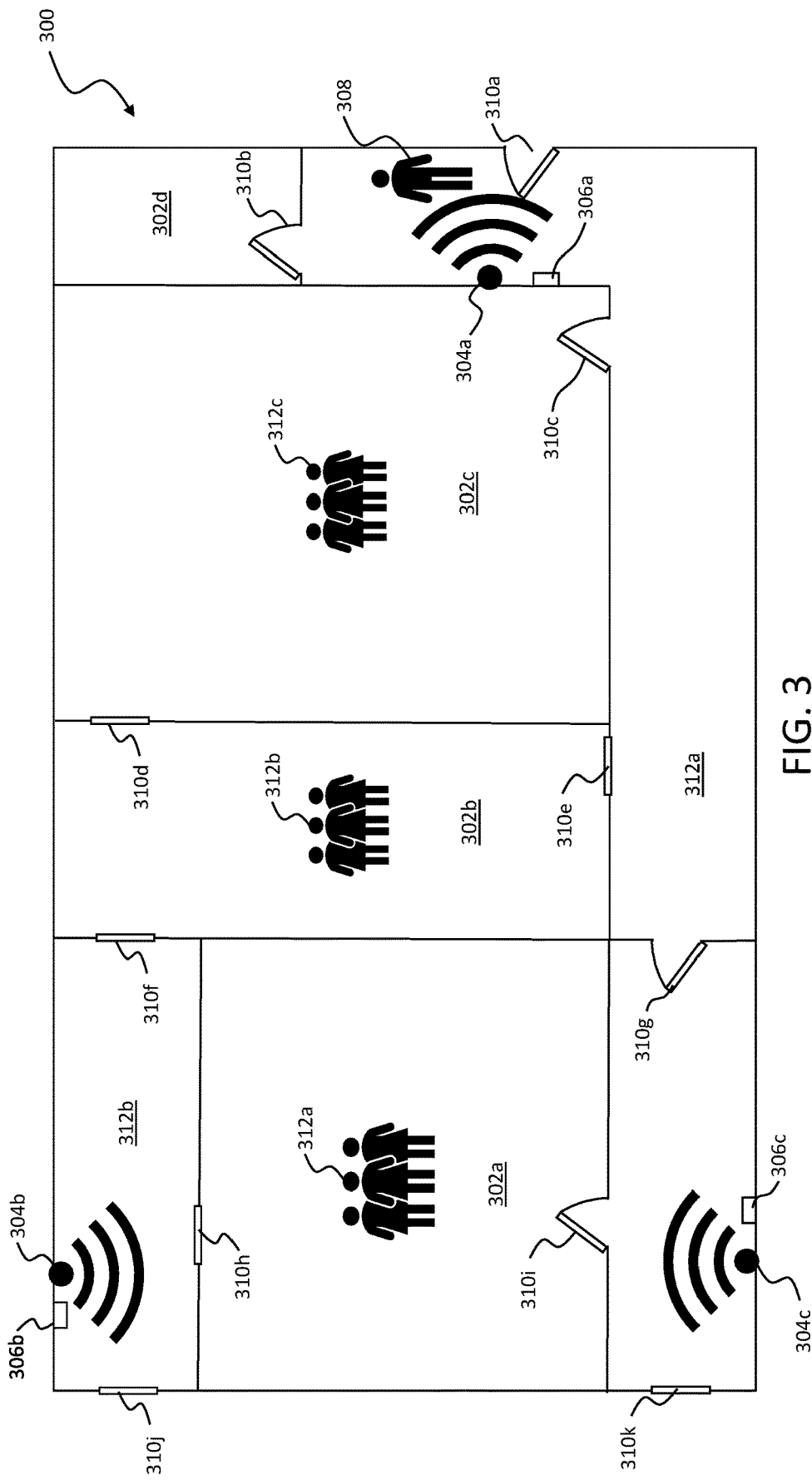
FIG. 3 illustrates an exemplary system for securing a facility and routing occupants to designated locations according to an exemplary implementation of the present disclosure.

FIG. 3 illustrates another example of a system 300 for detecting and responding to contraband, and will be described with a focus on occupant routing in accordance with the present disclosure. The illustrated facility has a front door 310a, two rear doors 310j, 310k, and a plurality of interior doors 310b-310i associated with a plurality of rooms 302a-302d and hallways 312a, 312b. Sensor 304a is disposed adjacent front door 310a, sensor 304b is disposed adjacent rear door 310j, and sensor 304c is disposed adjacent rear door 310k. In this regard, all ingress/egress points of the facility are covered by at least one sensor to ensure all targets entering the facility are scanned. Each sensor 304a-304c is associated with a controller 306a-306c, respectively, although a central controller (not shown) may be used in lieu of or in addition to controllers 306a-306c. Furthermore, each room 302a-302d may include a motion sensor, a thermal sensor, a camera, or any other device capable of determining a presence of occupants and reporting the presence of occupants to one or more controllers for use in determining a course of action.

Upon target 308 entering the facility through front door 310a, the target is scanned by sensor 304a. If the sensor 304a detects the present of contraband, controller 306a may initiate a course of action to address the threat. For example, sensor 304a may be a video recognition sensor that identifies a firearm. Initially, controller 306a may utilize its own location, the time elapsed since the contraband was detected (which may be indicative of the threat still being present at the sensor 304a), known locations of doors 310a-310k, known states of doors 310a-310k, known locations of occupants 312a-312c, and known locations and dimensions of rooms 302a-302c and hallways 312a-312b to determine a suitable course of action. With this information, the controller 306a may determine that a desired state of doors 310a-310b, 310d, 310f, 310h, and 310j is open to permit the occupants 312a-312c to egress through rear door 310j; a desired state of doors 310c, 310e, and 310g is closed and locked to isolate the threat and prevent occupants 302a-302c from moving into contact with the threat; and a desired state of doors 310i and 310k is closed and unlocked to dissuade occupants 312a from egressing in a direction toward hallway 312a in which the threat is disposed but also permitting them to do so in case they are aware of information unbeknownst to the controller 306a (e.g., hallway 312b crowded with occupants 302b-302c). In this regard, not only are doors surrounding the target 308 closed, but doors beyond that first layer of doors may be closed to effectuate a desired routing of occupants. With these desired door states, target 308 may be permitted to leave through front door 310a or may be attracted to the open door 310b which leads into empty room 302d. This may distract the target 308 while occupants 312a-312c egress toward rear door 310j. A control signal with the desired door states may be transmitted to barrier actuators associated with doors 310a-310k.

In the described example associated with FIG. 3, the barrier actuators are "smart actuators" which are capable of reporting their current state and reporting the receipt of instructions to a controller. However, it should be appreciated that alternative barrier actuators may be "dumb actuators" which merely change a barrier's state based on a received signal. For example, a gravity-driven door may be stored in a retracted, elevated position until a control signal is received at a barrier actuator which allows the door to fall closed. In the case of smart actuators, a single control signal may be sent by controller 306a to all barrier actuators associated with doors 310-310k and each barrier actuator may identify its respective desired state, determine if it is currently in that state, and if not, transition to the desired state which may include opening or closing and locking or unlocking. Alternatively, controller 306a may send separate control signals to each barrier actuator or may send a control signal only to the barrier actuators which are not currently in their desired state. Further still, each controller 306a-306c may be in communication with only certain doors in their proximity and controller 306a may send a request to controller 304b, for example, requesting that controller 304b close and lock door 310j.

If a camera system or other sensor (not shown) configured to track the target 308 determines that the target has progressed to door 310g, for example, the controller 306a may dynamically reconfigure the course of action and desired door states. Specifically, in case the threat breaches door 310g, the controller 306a may determine that door 310i should be locked to prevent any further occupants 312a from entering that portion of hallway 312a while allowing any occupants that already have entered the hallway to continue through door 310k.

If sensor 304c determines the threat 308 has, in fact, breached door 310g, it may again dynamically reconfigure the course of action, for example, to route any remaining occupants 312c toward front door 310a by opening door 310c.

Figure 4:
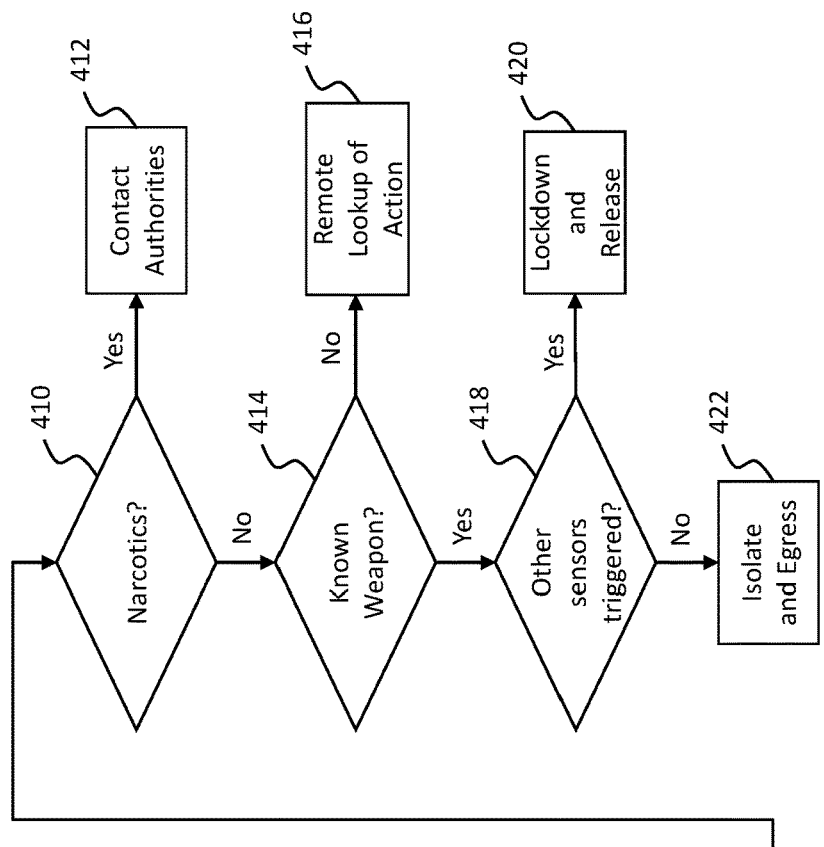
FIG. 4 is a flowchart of a method for securing a facility according to an exemplary implementation of the present disclosure.
Figure 4:
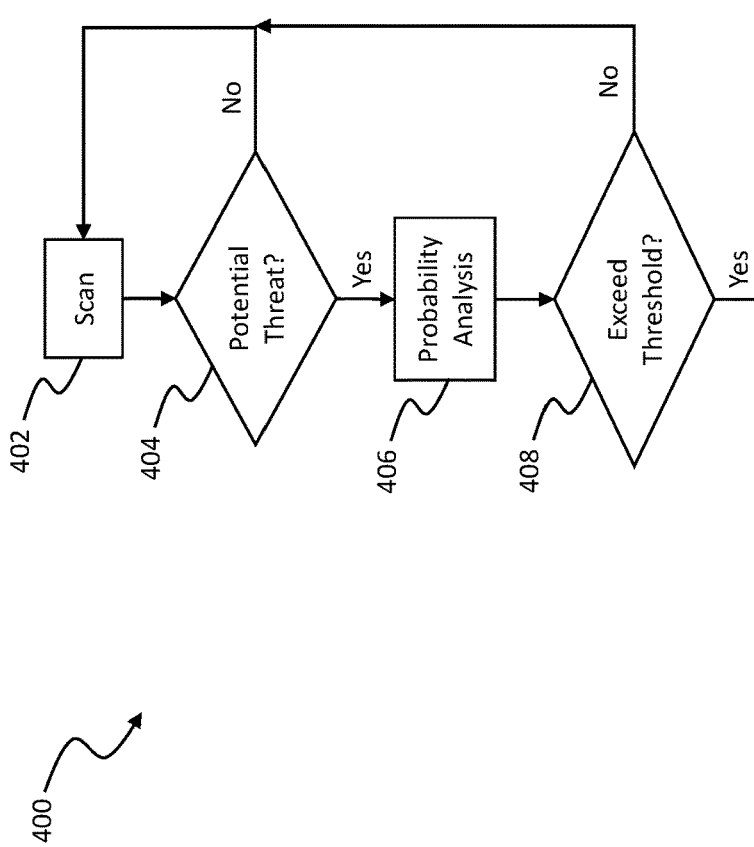

FIG. 4 illustrates one method 400 for securing a facility in response to detecting contraband. Initially, one or more sensors are used to scan 402 targets as they pass within range of the sensor(s), typically at entry points to the facility. It is then determined 404 whether or not the sensors detect potential contraband on the target. If not, the sensors continue to scan. If the sensors detect potential contraband, a probability analysis 406 may be performed to determine a likelihood of a presence of contraband. For example, an exposed firearm in the hand of a target may provide a 100% probability based upon clean and direct reflections of RF waves or a clear line of sight from a camera-based video recognition sensor. In contrast, a firearm concealed under a coat may be obscured from visual and RF view such that some indication of a concealed object is received at the sensor but it may or may not be sufficient to conclude that a firearm is present. Accordingly, a threshold may be established in a controller in advance of a scan to set a sensitivity of the sensor. The result of the probability analysis may then be compared to the threshold 408. If the threshold is not exceeded, it may be assumed that contraband is not present and scanning may continue. If the threshold is exceeded, the controller may next attempt to identify the contraband (or identification processes may be included in the probability analysis). However, it should be appreciated that some sensors are configured to identify only one type of contraband so the identification steps described herein may be unnecessary. If the controller determines 410 the contraband is narcotics, it may generate an alert to contact authorities 412 (e.g., based on contact information stored in memory of the controller). Other actions may also be initiated such as isolating the target by locking one or more barriers of the facility until authorities arrive.

If the controller determines the contraband is not narcotics, it may assess 414 whether or not the contraband is a weapon, or even a specific type of weapon (e.g., loaded firearm, firearm ammunition, explosive device, etc.). If the controller determines the contraband is likely a weapon but not one which it is familiar with, the controller may lookup 416 an appropriate action in a remote database. A manufacturer of the sensor or system may maintain a database of default actions in the case of an unidentified weapon. Alternatively, an appropriate course of action for handling an unknown weapon may be preprogrammed on the controller.

If the controller successfully determines the contraband is a known weapon, it may verify 418 whether or not any other sensors at the facility have been triggered (e.g., detected contraband). If other sensors have been triggered at other entrances to the facility, the controller may determine that multiple threats are entering the facility and may determine a suitable course of action is to lockdown 420 all occupants in place by closing and locking all barriers except those which provide the threats a route out of the building so they may leave before causing harm. Alternatively, if the controller determines only the one sensor has been triggered, it may implement a course of action to isolate 422 the threat by locking the barriers immediately surrounding the threat and providing egress routes by opening and closing certain barriers along identified egress routes leading away from the threat and toward facility exits.

Figure 5:
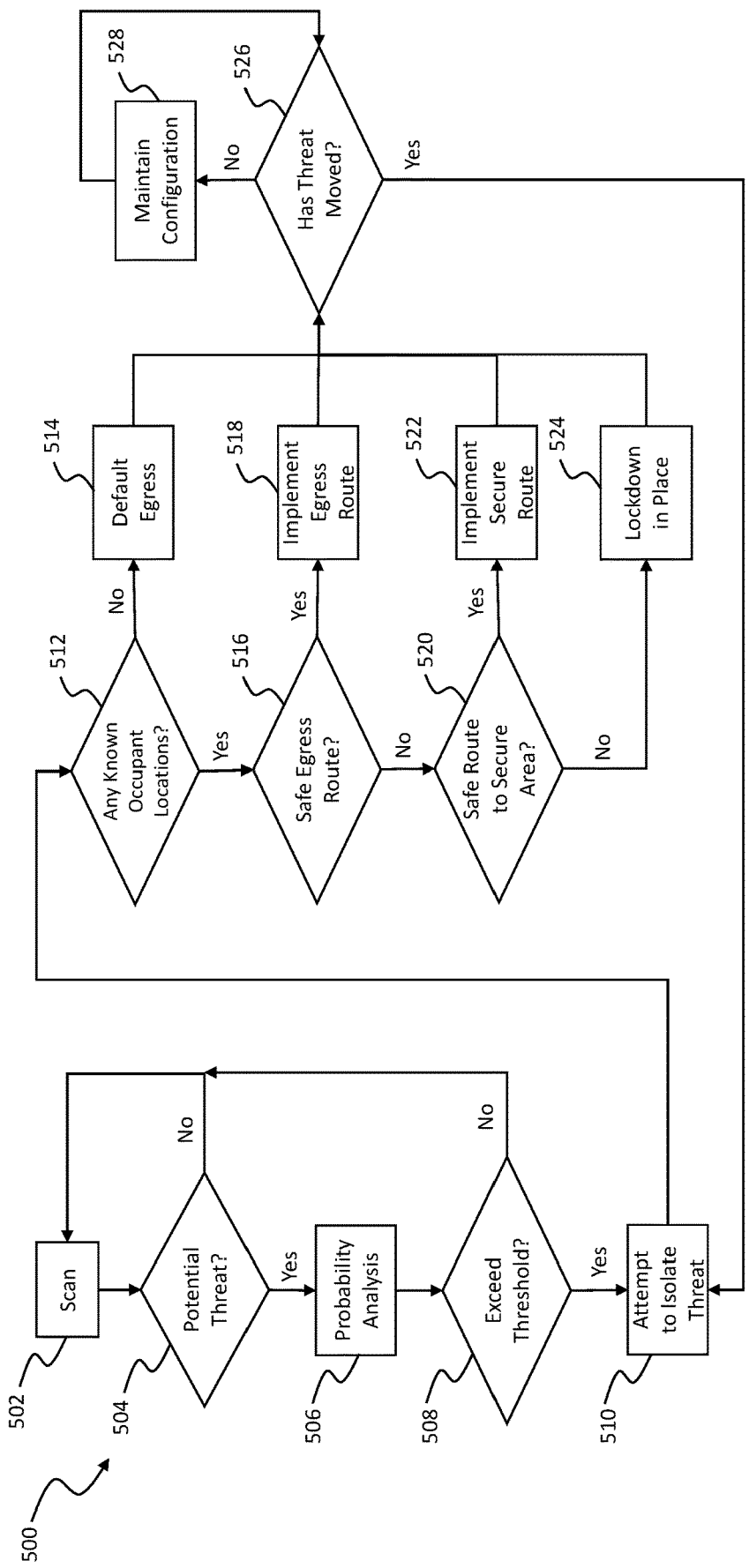
FIG. 5 is a flowchart of a method for securing a facility and routing occupants to designated locations according to an exemplary implementation of the present disclosure.

Turning to FIG. 5, an exemplary method 500 is shown for securing a facility and routing occupants to safe locations. Similar to method 400 of FIG. 4, method 500 begins with scanning 502, determining 504 if a potential threat exists, performing 506 a probability analysis, and comparing 508 the result of the probability analysis with a threshold value.

If the threshold is exceeded in a manner which indicates a weapon, the controller may attempt 510 to isolate the threat in its current location. The controller may then determine an appropriate course of action by referencing several factors that may be known to the controller. For example, the controller may verify 512 whether or not any locations are known for occupants of the facility. If not, a default egress route 514 may be implemented by opening, closing, and/or locking certain barriers to provide occupants a route away from the threat. If occupant locations are known, the controller may analyze 516 whether or not there is a safe egress route for a particular occupant or group of occupants. The process 516 of analyzing a safe egress route may include consideration of the location of the threat (e.g., based on the location of the triggered sensor), the location of the occupants in relation to barriers and passages, the type of weapon (e.g., a route for an explosive device may be selected to lead directly away from a potential blast radius and provide multiple layers of shielding with walls whereas a route for a knife may be designed only to maintain one layer of separation between occupants and the threat), whether the threat is believed to be a lone actor or part of a group which may be entering at other entrances, or any other relevant information. If the controller determines a safe egress route is available to get the occupants out of the facility, it may implement 518 the egress route by opening, closing, and/or locking certain barriers to provide protection from the threat and a clear path out of the facility. This process of analyzing egress routes may be performed separately for each group of occupants. That is, an egress route for a group of occupants in one location may be evaluated separately from an egress route for a different group of occupants in a different location.

If no safe egress route is found, for example due to the threat being at the only entrance or multiple potential threats being detected about the facility, the controller may assess 520 whether or not any routes are available to a secure area (e.g., safety bunker, room with reinforced doors, a location of an armed guard, etc.). If yes, the controller may implement 522 the secure route. If not, the controller may determine that a default action of locking down 524 occupants in place may be a suitable course of action.

Regardless of the action implemented by the controller (e.g., 514, 518, 522, or 524), the controller may continuously monitor 526 whether or not the threat has moved. This may be based upon video cameras or motion detectors distributed throughout the facility which track the target through the facility after the target is identified as a threat, or may be estimated or inferred based upon elapsed time since a sensor was triggered. A direction of travel of a threat may be inferred by assessing which sensor of a pair of sensors has been triggered more recently. If it is determined that the threat has not moved, the controller may maintain 528 the current configuration of barriers. If the threat has move, the controller may again attempt 510 to isolate the threat and assess occupant locations and potential routes.

Advantageously, the utilities of the present disclosure provide for automated and dynamic responses to contraband. These responses may be implemented free from human intervention which provides for swift deployment of a suitable course of action to isolate a threat within a region of a facility, urge a threat to leave a facility, and/or route occupants to safe areas or exits using manipulable barriers controlled by barrier actuators to open, close, and/or lock specific doors to improve efficiency during evacuation or lockdown.

One or more elements in embodiments of this disclosure may be implemented in software to execute on the processor 108 of a control processing system such as the controller 104. When implemented in software, the elements of the embodiments of the invention are essentially the code segments to perform the necessary tasks. The program or code segments can be stored in the memory 106, which may be a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In one embodiment, the control system supports wireless communication protocols such as Bluetooth, IrDA, HomeRF, IEEE 802.11, DECT, and Wireless Telemetry.

Note that the processes and displays presented may not inherently be related to any particular computer or other apparatus. Various general-purpose systems may be used with programs in accordance with the teachings herein, or it may prove convenient to construct a more specialized apparatus to perform the operations described. The required structure for a variety of these systems will appear as elements in the claims. In addition, the embodiments of the invention are not described with reference to any particular programming language. It will be appreciated that a variety of programming languages may be used to implement the teachings of the invention as described herein.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A facility access regulating system, comprising:
a sensor configured to inspect a target to detect contraband;
a controller configured to communicate with the sensor to receive an indication of contraband from the sensor;
a first barrier actuator and a second barrier actuator configured to communicate with the controller;
wherein, in response to receiving the indication of contraband, the controller is configured to determine a desired state of each barrier of a facility and transmit a control signal to the first and second barrier actuators to manipulate at least one barrier into a desired state, wherein the controller is configured to determine the desired state of each barrier based on at least a status of a second sensor disposed remotely from the sensor, wherein the status of the second sensor indicates whether the second sensor has detected contraband.

2. The system of claim 1, wherein the desired state is a secure state.

3. The system of claim 1, wherein the desired state is an open state.

4. The system of claim 1, wherein at least one of the first and second barrier actuators comprises a spring-driven mechanism configured to bias a respective barrier to an open state or a closed state.

5. The system of claim 1, wherein at least one of the first and second barrier actuators comprises an electric motor-driven mechanism to transition a respective barrier between states.

6. The system of claim 1, wherein the sensor comprises a camera-based recognition sensor programmed to visually determine the presence of contraband, wherein the contraband includes at least one of a gun, a knife, or an explosive device.

7. The system of claim 1, wherein the sensor comprises a radiofrequency transceiver configured to determine the presence of contraband including at least one of a knife, a gun, or an explosive device.

8. The system of claim 7, wherein the radiofrequency transceiver comprises a microwave radar or ultra-wideband transceiver, and wherein the controller is configured to determine the presence of contraband by analyzing a late time response of radiofrequency waves transmitted toward the target.

9. The system of claim 1, wherein the sensor comprises a passive electronic sensor configured to detect an electronic signature associated with an explosive or flammable substance.

10. The system of claim 1, wherein the sensor comprises an airborne molecule detection sensor configured to detect low-concentrations of contraband molecules in air near the target, wherein the contraband molecules include at least one of an explosive substance, a flammable substance, a narcotic, a chemical agent, a biological agent, or a volatile organic.

11. A facility access regulating system, comprising:
a memory configured to store a program for determining a desired state of at least one barrier in response to receipt of an indication of contraband from a sensor;
a processor in operative communication with the memory and configured to execute the program to generate instructions; and
a transmitter configured to send a control signal comprising the instructions to at least one barrier actuator of a facility configured to regulate at least two states of the at least one barrier including an open state and a closed state, wherein the instructions include the desired state of the at least one barrier, wherein the desired state of the at least one barrier is the open state, wherein the desired state of the at least one barrier is determined based on a status of a second sensor disposed remotely from the sensor and a location of the second sensor, and wherein the status of the second sensor indicates whether the second sensor has detected contraband.

12. The system of claim 11, further comprising:
the sensor, wherein the sensor is configured to detect the contraband.

13. The system of claim 11, wherein the at least one barrier actuator comprises a first barrier actuator and a second barrier actuator, the at least one barrier comprises a first barrier associated with the first barrier actuator and a second barrier associated with the second barrier actuator, and wherein a desired state of the first barrier is closed and a desired state of the second barrier is open.

14. The system of claim 13, wherein the instructions comprise a single set of instructions sent by the transmitter to both the first barrier actuator and the second barrier actuator.

15. The system of claim 13, wherein the instructions comprise a first instruction sent only to the first barrier actuator and a second instruction sent only to the second barrier actuator.

16. A facility access regulating system, comprising:
a sensor configured to detect contraband including at least one of a knife, a gun, an explosive device, an explosive substance, a narcotic, a chemical agent, a biological agent, or a volatile organic; and
a controller, the controller comprising:
a memory configured to store a program for determining a desired state of at least one barrier in response to receipt of an indication of contraband from the sensor;
a processor in operative communication with the memory and configured to execute the program to generate instructions; and
a transmitter configured to send at least one control signal comprising the instructions to at least one barrier actuator of a facility configured to regulate at least two states of the at least one barrier including an open state and a closed state, wherein the instructions include the desired state of the at least one barrier, wherein the desired state of at least one barrier is the open state, wherein the desired state of the at least one barrier is determined based on a status of a second sensor disposed remotely from the sensor and a location of the second sensor, and wherein the status of the second sensor indicates whether the second sensor has detected contraband.

17. The system of claim 16, wherein the sensor comprises:
a camera-based recognition sensor;
a passive electronic sensor;
an airborne molecule detection sensor; or
a radiofrequency transceiver.

18. The system of claim 17, further comprising:
the at least one barrier actuator, wherein the at least one barrier actuator is configured for engagement with an existing barrier of the facility.

19. The system of claim 18, wherein the at least one barrier actuator comprises a mechanism for locking the barrier when the barrier is in a closed state.

20. The system of claim 17, further comprising:
the at least one barrier actuator; and
the at least one barrier, wherein the at least one barrier is configured for installation within an existing portal of the facility.

21. A facility access regulating system, comprising:
a sensor operable to inspect a target to detect contraband;
a controller in operative communication with the sensor to receive an indication of detected contraband from the sensor in response to the sensor detecting contraband;
a barrier in a facility, the barrier being disposed remotely from the sensor and having at least an open state and a closed state; and
a barrier actuator in operative communication with the controller, the barrier actuator associated with the barrier to transition the barrier between one of the open state and the closed state to the other of the open state and the closed state;
wherein, in response to the indication of detected contraband, the controller is operable to determine a desired state of the barrier based on at least a status of a second sensor disposed remotely from the sensor, wherein the status of the second sensor indicates whether the second sensor has detected contraband, and transmit a control signal to the barrier actuator to move the barrier into the desired state, wherein the desired state of the barrier is the open state.

* * * * *